(12) United States Patent
Chien et al.

(10) Patent No.: US 8,238,605 B2
(45) Date of Patent: Aug. 7, 2012

(54) DIGITAL VIDEO TARGET MOVING OBJECT SEGMENTATION METHOD AND SYSTEM

(75) Inventors: Shao-Yi Chien, Taipei (TW); Wei-Kai Chan, Taipei (TW); Chun-Fu Shen, Taipei (TW)

(73) Assignees: National Taiwan University, Taipei (TW); Vivotek Inc., Taipei (TW)

( * ) Notice: Subject to any disclaimer, the term of this patent is extended or adjusted under 35 U.S.C. 154(b) by 979 days.

(21) Appl. No.: 12/286,795

(22) Filed: Oct. 2, 2008

(65) Prior Publication Data

US 2009/0245571 A1    Oct. 1, 2009

(30) Foreign Application Priority Data

Mar. 31, 2008    (TW) ................................ 97111816 A

(51) Int. Cl.
G06K 9/00    (2006.01)
G06K 9/34    (2006.01)

(52) U.S. Cl. ........................................ 382/103; 382/173

(58) Field of Classification Search .................. 382/103, 382/173
See application file for complete search history.

(56) References Cited

U.S. PATENT DOCUMENTS

| | | | |
|---|---|---|---|
| 6,335,988 B1 * | 1/2002 | Kondo | 382/236 |
| 7,969,470 B2 * | 6/2011 | Kishida | 348/208.14 |
| 8,019,157 B2 * | 9/2011 | Chen et al. | 382/173 |
| 2003/0103648 A1 * | 6/2003 | Ito et al. | 382/103 |
| 2004/0151342 A1 * | 8/2004 | Venetianer et al. | 382/103 |
| 2007/0280540 A1 * | 12/2007 | Ikeda | 382/195 |

OTHER PUBLICATIONS

Shao-Yi Chien; Yu-Wen Huang; Bing-Yu Hsieh; Shyh-Yih Ma; Liang-Gee Chen; , "Fast video segmentation algorithm with shadow cancellation, global motion compensation, and adaptive threshold techniques," Multimedia, IEEE Transactions on , vol. 6, No. 5, pp. 732-748, Oct. 2004.*
Wei-Kai Chan; Shao-Yi Chien; , "Real-Time Memory-Efficient Video Object Segmentation in Dynamic Background with Multi-Background Registration Technique," Multimedia Signal Processing, 2007. MMSP 2007. IEEE 9th Workshop on , vol., No., pp. 219-222, Oct. 1-3, 2007.*
Shao-Yi Chien; Shyh-Yih Ma; Liang-Gee Chen; , "Efficient moving object segmentation algorithm using background registration technique," Circuits and Systems for Video Technology, IEEE Transactions on , vol. 12, No. 7, pp. 577-586, Jul. 2002.*

* cited by examiner

*Primary Examiner* — Bhavesh Mehta
*Assistant Examiner* — Utpal Shah
(74) *Attorney, Agent, or Firm* — Peter F. Corless; Steven M. Jensen; Edwards Wildman Palmer LLP

(57) ABSTRACT

A digital video target moving object segmentation method and system is designed for processing a digital video stream for segmentation of every target moving object that appears in the video content. The proposed method and system is characterized by the operations of a multiple background imagery extraction process and a background imagery updating process for extracting characteristic background imagery whose content includes the motional background objects in addition to the static background scenes; and wherein the multiple background imagery extraction process is based on a background difference threshold comparison method, while the background imagery updating process is based on a background-matching and weight-counting method. This feature allows an object mask to be defined based on the characteristic background imagery, which can mask both the motional background objects as well as the static background scenes.

29 Claims, 5 Drawing Sheets

DIGITAL VIDEO TARGET MOVING OBJECT SEGMENTATION METHOD AND SYSTEM

BACKGROUND OF THE INVENTION

1. Field of the Invention

This invention relates to digital video processing technology, and more particularly, to a digital video target moving object segmentation method and system which is designed for processing a digital video stream for segmentation of each target moving object that appears in the video content.

2. Description of Related Art

Digital video segmentation is a digital video processing technology that is widely utilized in security monitoring systems for processing video images captured by video cameras and producing a background-erased video sequence that shows only target moving objects (such as an unauthorized intruder), while erasing all background objects (such as doors, windows, and furniture). In the case of unauthorized trespassing, the background-erased video sequence allows the security personnel to investigate the case by focusing on the image of the intruder without distractions by the background objects. Moreover, the segmentation results can be employed by other functions, such as target tracking, target description, target classification, and target recognition, in an automatic video surveillance system.

Presently, many various types of video segmentation techniques have been proposed for segmentation of moving objects in video images. These conventional techniques are capable of distinguishing moving objects from static objects in the video images; and therefore in the application of security monitoring, since an intruder is a moving object and background objects such as doors, windows, and furniture are static objects, the image of the intruder can be segmented from the background objects.

One drawback of the above-mentioned prior arts, however, is that in some cases, background objects might include moving parts, such as electrical fans with rotating blades, trees and flowers with swinging leaves and stems caused by wind, to name a few. In this case, the resultant video image will nonetheless contain images of these motional background objects together with the image of the intruder, which are visually distractive in the investigation of the video images. Moreover, the existence of motional background objects often causes faulty detections in automated security monitoring systems.

In view of the above-mentioned drawback of the prior art, there exists a need in security monitoring systems for a new video segmentation technology that can erase all background objects, including static background scene and motional background objects, while detecting and displaying only the target moving objects.

SUMMARY OF THE INVENTION

It is therefore an objective of this invention to provide a digital video target moving object segmentation method and system that can erase both static background scene and motional background objects while detecting only the target moving objects.

The digital video target moving object segmentation method and system according to the invention is designed for providing a moving object segmentation function that can erase all background objects, including the static background scene and every motional background object while displaying only the target moving objects in the resultant video images. The invention is also applicable for integration to human computer interfaces, digital image analysis, pattern recognition, machine learning, to name a few.

In architecture, the digital video target moving object segmentation system of the invention comprises: (A) a multiple background imagery extraction module; (B) a background imagery updating module; and (C) a target object extraction module; and can further comprise: (D) a pre-processing module; and (E) a post-processing module.

The digital video target moving object segmentation method and system according to the invention is characterized by the operations of a multiple background imagery extraction process and a background imagery updating process for extracting characteristic background imagery whose content includes the motional background object in addition to the static background scene; and wherein the multiple background imagery extraction process is based on a background difference threshold comparison method, while the background imagery updating process is based on a background-matching and weight-counting method. This feature allows an object mask to be defined based on the characteristic background imagery, which can mask both the motional background object as well as the static background scene.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The digital video target moving object segmentation method and system according to the invention is disclosed in full details by way of preferred embodiments in the following with reference to the accompanying drawings.

FUNCTIONAL MODEL OF THE INVENTION

Figure 1:
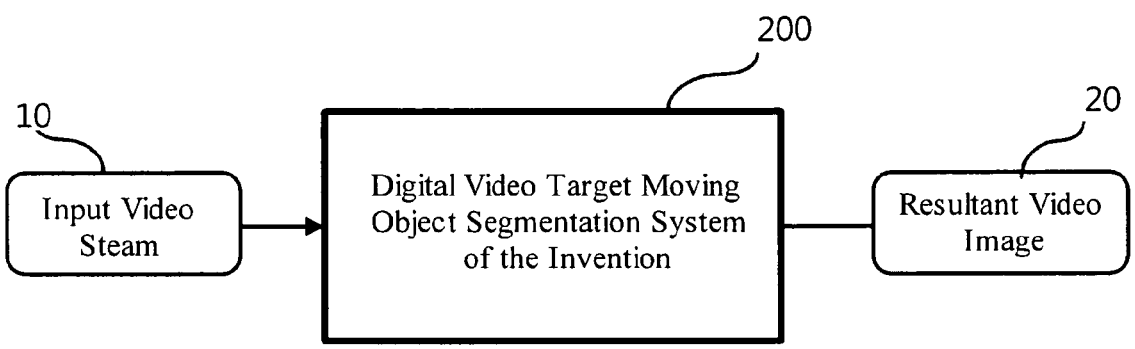
FIG. 1 is a schematic diagram showing the functional model of the digital video target moving object segmentation system of the invention.

FIG. 1 shows the functional model of the digital video target moving object segmentation system of the invention (which is here encapsulated in a box indicated by the reference numeral 100). As shown, the digital video target moving object segmentation system of the invention 100 is used for processing an input video stream 10, such as a video stream captured by a security monitoring camera (not shown), for video segmentation of the input video stream 10 to thereby produce a background-erased video sequence 20.

Figure 2A:
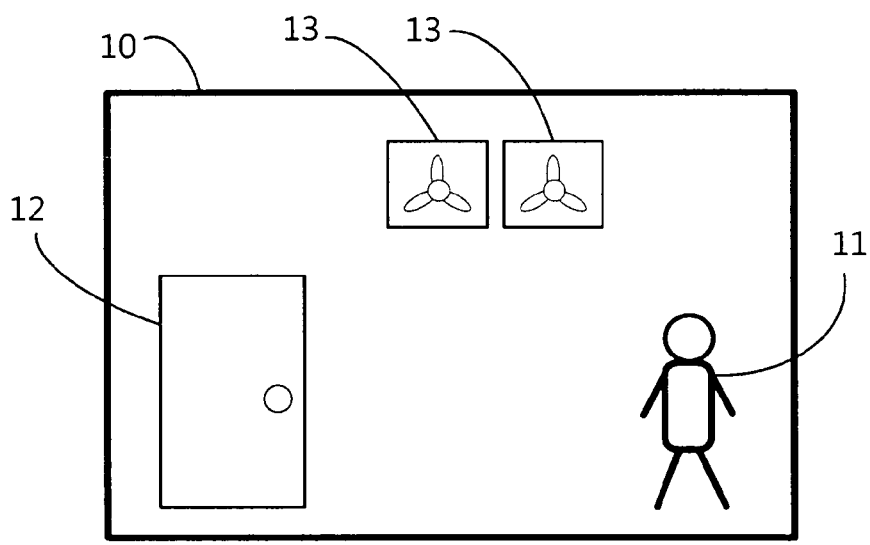
FIG. 2A is a schematic diagram showing an instance of the scene of a monitored locality.
Figure 2B:
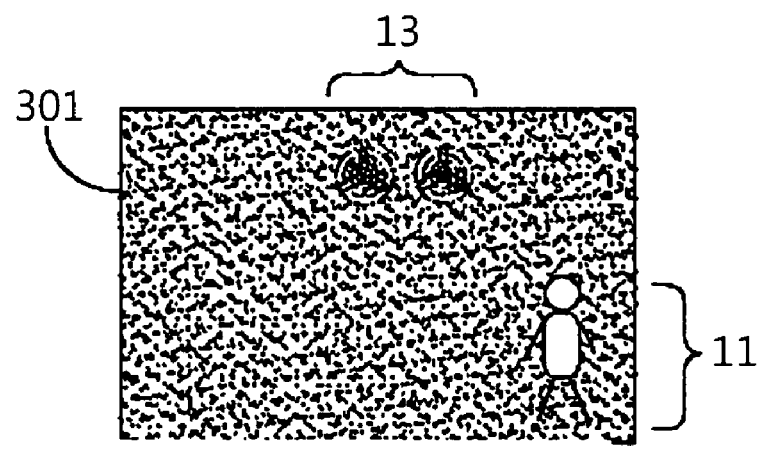
FIG. 2B (PRIOR ART) is a schematic diagram showing an object mask which is produced by using conventional video segmentation technology.
Figure 2C:
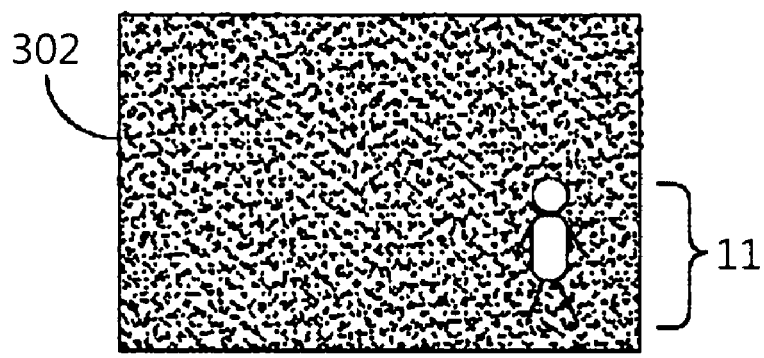
FIG. 2C is a schematic diagram showing an object mask which is produced by using the invention.
Figure 2D:
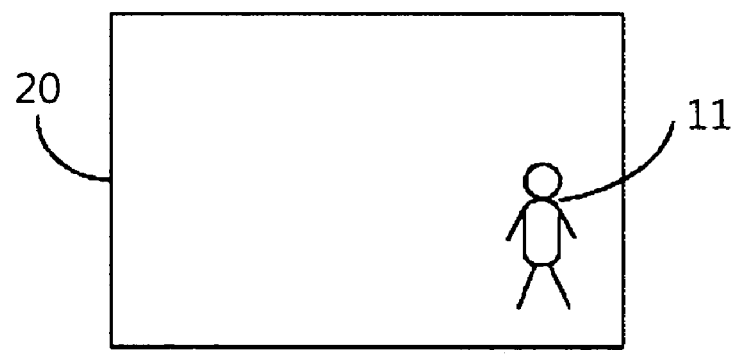
FIG. 2D is a schematic diagram showing a background-erased video image produced by the invention.

As shown in FIG. 2A, assume the input video stream 10 is a sequence of motion images of a monitored locality, such as the interior of an office building. The content of the input video stream 10 includes a target moving object 11 (such as an unauthorized intruder), a static background scene 12 (such as doors, windows, and furniture), and a motional background object 13 (such as electrical fans). In this case, as shown in FIG. 2B, by using conventional video segmentation technology, the resultant object mask 301 will be only capable of masking the static background scene 12 but unmasking the motional background object 13, i.e., all motional objects irrespective of the target or the background will be displayed in the resultant video image. In comparison, as shown in FIG. 2C, the resultant object mask 302 is capable of masking both the static background scene 12 and the motional background object 13 while unmasking the target moving object 11. As a result, as shown in FIG. 2D, the resultant video sequence 20 will only show the target moving object 11 while erasing all pieces of background imagery (i.e., both the static background scene 12 and the motional background object 13).

ARCHITECTURE OF THE INVENTION

Figure 3:
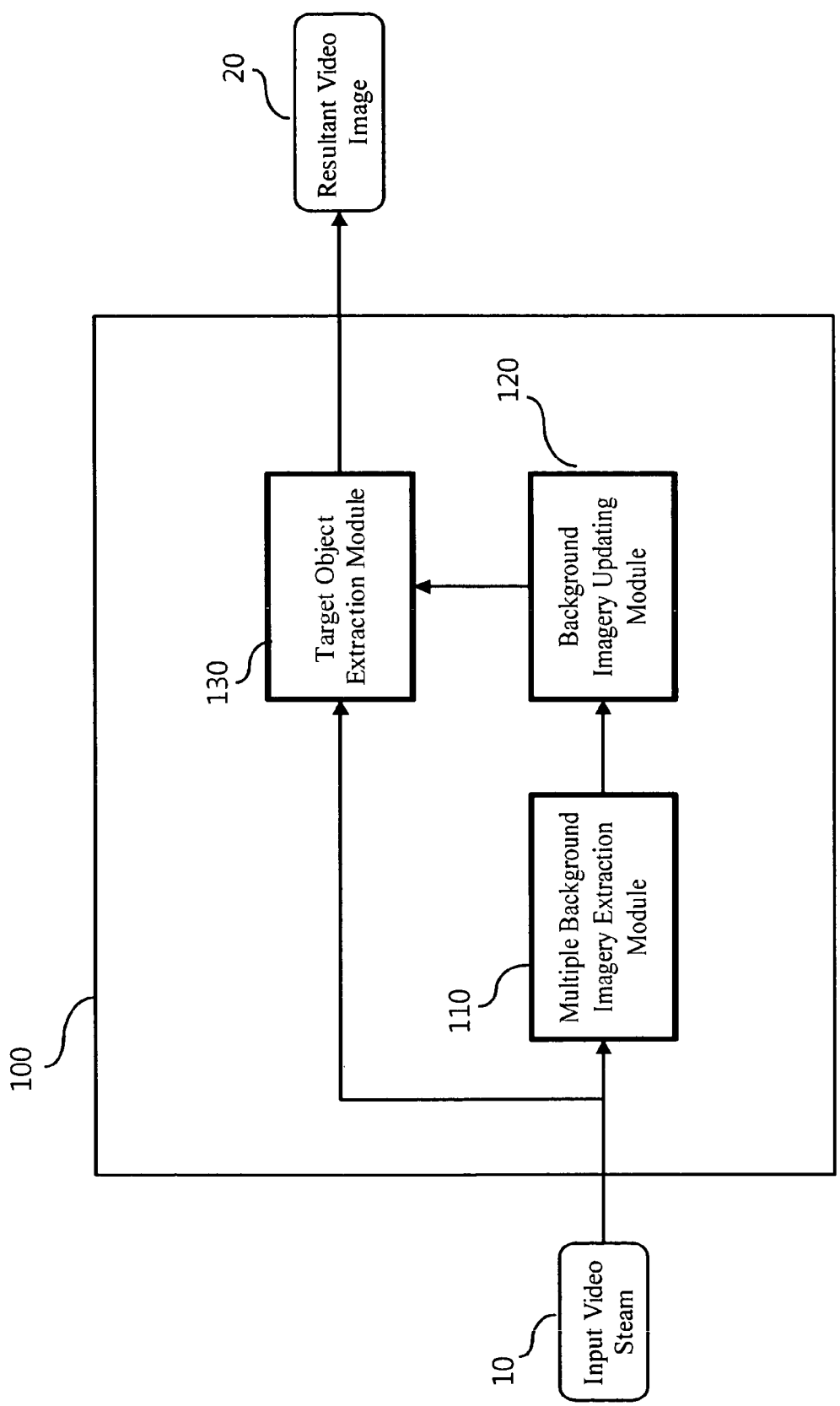
FIG. 3 is a schematic diagram showing a modularized architecture of the digital video target moving object segmentation system of the invention.
Figure 4:
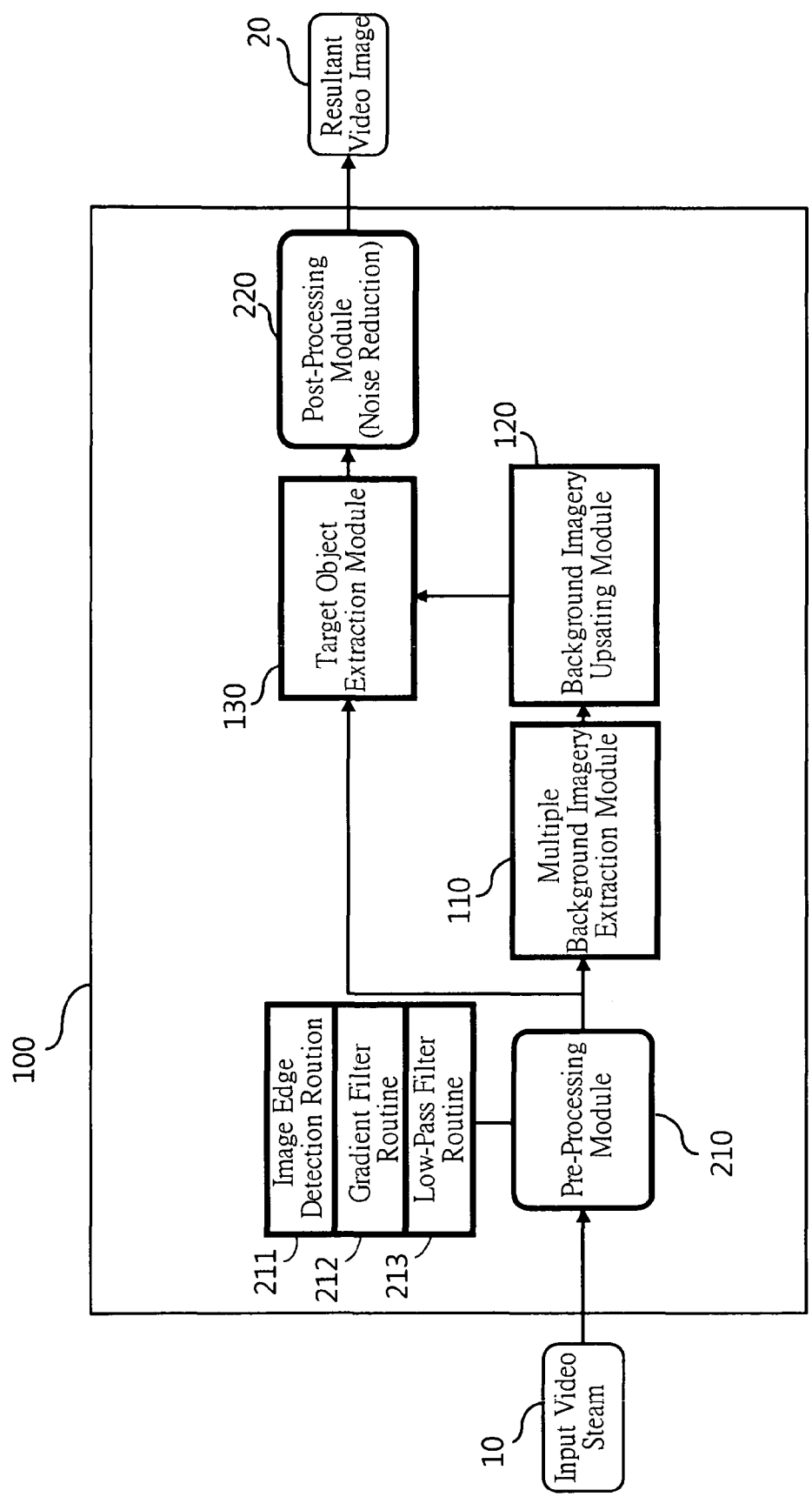
FIG. 4 is a schematic diagram showing another embodiment of the architecture of the digital video target moving object segmentation system of the invention.

As shown in FIG. 3, in architecture, the digital video target moving object segmentation system of the invention 100 comprises: (A) a multiple background imagery extraction module 110; (B) a background imagery updating module 120; and (C) a target object extraction module 130; and as shown in FIG. 4, can further comprise: (D) a pre-processing module 210; and (E) a post-processing module 220. Firstly, the respective attributes and functions of these constituent system components of the invention are described in details in the following.

Multiple Background Imagery Extraction Module 110

The multiple background imagery extraction module 110 is capable of processing each frame of the input video stream 10 based on a background difference threshold comparison method for extracting one or more pieces of background imagery of the monitored locality (assume the number of extracted pieces of the background imagery is N), where each piece of the background imagery includes the static background scene 12 and the motional background object 13.

In practice, the number N can be any integer number, such as 1, 2, 3, 4, or more. Fundamentally, the use of a larger value of N will result in a better performance but requires a larger amount of memory and processing time for implementation. Preferably, N=4 is selected as a tradeoff.

The multiple background imagery extraction module 110 processes the input video stream 10 based on an algorithm described below. This algorithm involves the use of the following parameters: CurFrm(i, j), BImg (i, j, k), Occupied (i, j, k), and Built(i, j, k), where CurFrm(i, j) represents each pixel of the current frame, where i and j are the coordinates of the pixel;

BImg (i, j, k) represents each pixel of the (k)th extracted piece of background imagery, which shows all background objects in image content, where k represents the sequence number of the extracted background imagery;

Occupied (i, j, k) represents an occupied-status indicator, which is associated with each pixel on the (k)th piece of background imagery and is used to indicate whether the associated pixel is being occupied by the image of the target moving object 11, the static background scene 12, or the motional background object 13 (0 represents unoccupied status, while 1 represents occupied status), and where k represents the sequence number of the associated background imagery;

Built(i, j, k) represents a background indicator, which is associated with each pixel of each extracted piece of background imagery for indicating whether the associated pixel represents the image of a background object (including the static background scene 12 and the motional background object 13), and where k represents the sequence number of the extracted background imagery.

Figure 5:
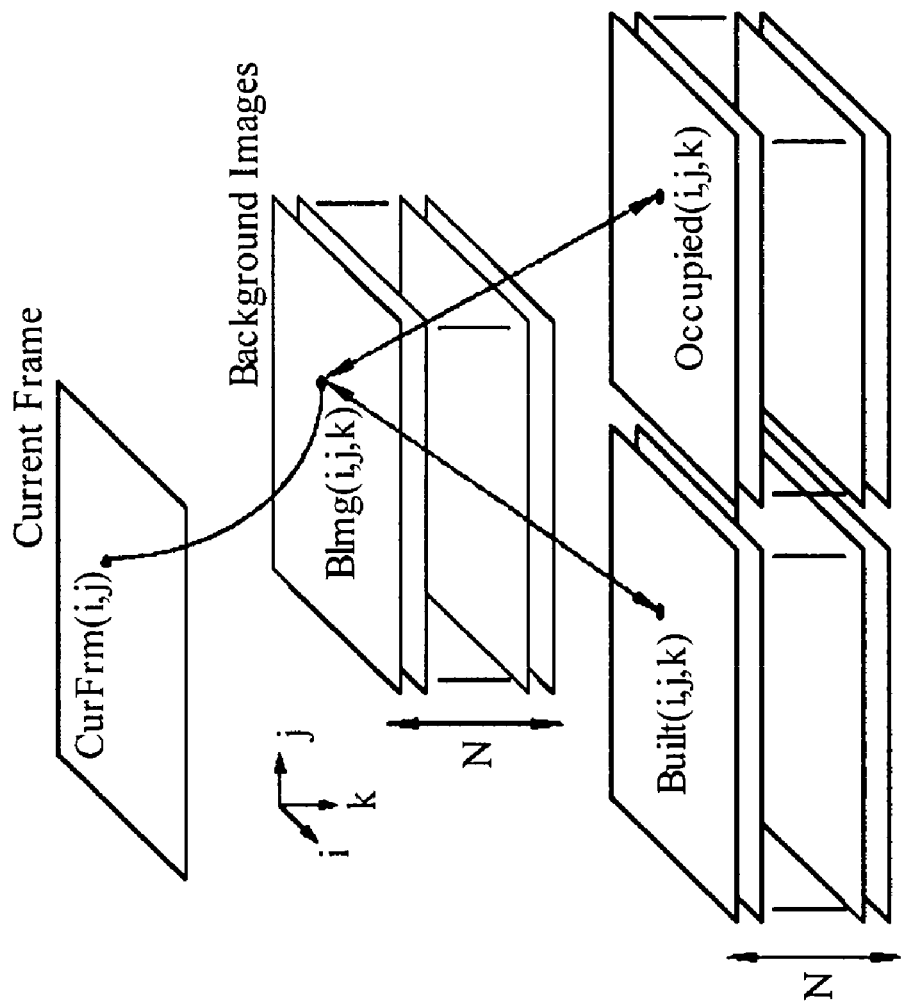
FIG. 5 is a schematic diagram used to depict the principle of the multiple background imagery extraction method performed by the invention.

FIG. 5 shows the mapping relations of the above-mentioned four parameters CurFrm(i, j), BImg(i, j, k), Built(i, j, k), and Occupied (i, j, k).

During operation, the parameter Occupied(i, j, k) is set as follows:

$$\text{Occupied }(i, j, k) = \begin{cases} 1 & \text{If } BImg(i, j, k) \text{ is occupied} \\ 0 & \text{If } BImg(i, j, k) \text{ is unoccupied} \end{cases}$$

and the parameter Built (i, j, k) is set as follows:

$$\text{Built }(i, j, k) = \begin{cases} 1 & \text{If } Wgt_k \square RegInth_k \\ 0 & \text{If } Wgt_k < RegInth_k \end{cases}$$

where $RegInth_k$ represents a threshold for use to determine whether BImg (i, j, k) belongs to the image of the background; and $Wgt_k$ represents a weight assigned to BImg (i, j, k), and whose value is dependent on the number of times BImg (i, j, k) matches in value to CurFrm(i, j).

Whether BImg (i, j, k) matches in value to CurFrm(i, j) is determined in accordance with the following rule:

If $(BD_{k-y} \leq BDth_{k-y})$ and $(BD_{k-u} \leq BDth_{k-u})$ and $(BD_{k-v} \leq BDth_{k-v})$ are all TRUE, then the result is a match; otherwise, a mismatch.

where y, u, v are respectively the Y, U, and V values of the pixel in YUV color space;

$BD_{k-y} = |CurFrm(i,j)_y - BImg(i,j,k)_y|$ $BD_{k-u} = |CurFrm(i,j)_u - BImg(i,j,k)_u|$ $BD_{k-v} = |CurFrm(i,j)_v - BImg(i,j,k)_v|$ $BDth_k$ represents a background difference threshold, which is used to determine whether BImg (i, j, k) matches in value to CurFrm(i, j).

It is to be noted that in the embodiment of the invention, the color space utilized in the background difference comparison is YUV, but any other type of color space can be used, such as RGB, YCbCr, CMYK, YIQ, CIEXYZ, GRAY, LINEAR_RGB, PYCC, sRGB, aRGB, TYPE_2CLR, TYPE_3CLR, TYPE_4CLR, TYPE_5CLR, TYPE_6CLR, TYPE_7CLR, TYPE_8CLR, TYPE_9CLR, TYPE_ACLR, TYPE_BCLR, TYPE_CCLR, CMY, TYPE_DCLR, TYPE_ECLR, TYPE_FCLR, HLS, HSV, Lab, Luv, XYZ, Yxy, to name a few. Fundamentally, any type of color space can be used. Besides color values, the background imagery can also store the gradient value of the background objects' image.

In practice, the background difference threshold $BDth_k$ can be set by using the following three different methods: (1) a manual preset method, which is manually carried out by human labor, such as by an application engineer, based on the noise characteristics of the video equipment where the input video stream 10 is generated; (2) an automatic noise-adaptive adjustment method, which is automatically performed during operation by detecting the noise characteristics of the video equipment where the input video stream 10 is generated. This method can determine an optimal value for the background difference threshold $BDth_k$ based on a special algorithm; and (3) a Gaussian model based or MoG (Mixture of Gaussians) model based algorithm for determining an optimal value for $BDth_k$.

Background Imagery Updating Module 120

The background imagery updating module 120 is capable of updating each characteristic background imagery produced by the multiple background imagery extraction module 110. In practice, this background imagery updating process is based on a background-matching and weight-counting algorithm, as described below.

In this algorithm, a counter $CntSNO_k$ is used for counting the number of times the parameter BImg (i, j, k) of the (k)th piece of background imagery mismatches in value to the parameter CurFrm(i, j) of the current frame, as follows:

$$CntSNO_k = \begin{cases} 0 & \text{If a match} \\ CntSNO_k + 1 & \text{If a mismatch} \end{cases}$$

Further, the background imagery updating module 120 determines the value of the weight $Wgt_k$ based on the following criteria:

$$Wgt_k = \begin{cases} Wgt_k + 1 & \text{if a match} \\ Wgt_k - 1 & \text{if } CntSNO_k > BDF_k \\ Wgt_k & \text{Otherwise} \end{cases}$$

where $BDF_k$ is a background decaying factor.

It is assumed that if the weight $Wgt_k$ of a certain pixel of the background imagery whose Built (i, j, k)=1 is lower than a threshold $RELth_k$, then this pixel should be excluded from the background imagery, i.e., this pixel was previously associated with a background object but the background object no longer appears in the current frames. Each pixel of the background imagery $BImg(i, j, k)_y$ is updated as follows:

$$BImg(i, j, k)_y = \begin{cases} UpdBckgnd_y & \text{If a match} \\ 0 & \text{If Built } (i, j, k) = 1 \text{ and } Wgt_k < RELth_k \\ 0 & \text{If Built } (i, j, k) = 0 \text{ and } Wgt_k = 0 \end{cases}$$

where $$UpdBckgnd_y = \frac{BImg(i, j, k)_y \times Wgt_k + CurFrm(i, j)_y}{Wgt_k + 1}$$

Further, the pixels of the background imagery with Built(i, j, k)=0 are set to the status of being excluded when the associated weight $Wgt_k$ drops to 0, and its Occupied(i, j, k) is set to 0. The U-based piece of background imagery $BImg(i, j, k)_u$ and the V-based piece of background imagery $BImg(i, j, k)_v$ are also updated in the same manner.

Target Object Extraction Module 130

The target object extraction module 130 is capable of performing a target object extraction process based on the characteristic background imagery produced by the background imagery updating module 120. An object mask Ini_Object_Mask(i, j) is produced based on the following algorithm:

$$Ini\_Object\_Mask(i, j) = \begin{cases} 0 & \text{If } \exists k, \text{Built } (i, j, k) = 1 \text{ and a match} \\ 1 & \text{Otherwise} \end{cases}$$

As illustrated in FIG. 2C, the object mask 302 defines an unmasking portion for the target moving object 11 and a masking portion for both the static background scene 12 and the motional background object 13. This object mask 302 is then superimposed to the current frame of the input video stream 10, whereby only the target moving object 11 is displayed in the current frame of the input video stream 10 while the static background scene 12 and the motional background object 13 are masked and thus invisible, as illustrated in FIG. 2D.

Moreover, the object mask 302 can be further used by other computer vision algorithms for the information about the objects' locations, sizes, shapes, and so on. Further analysis functions, such as object tracking, description, classification, and recognition, can be performed on the basis of the target moving object segmentation method of the invention.

Pre-Processing Module 210

The pre-processing module 210 is an optional system component which is used for optimal performance of the video segmentation performed by the invention. In practice, for example, the pre-processing module 210 can include an image edge detection routine 211, a gradient filter routine 212, and a low-pass filter routine 213. The image edge detection routine 211 is capable of performing an edge detection (or called edge filtering) operation on each frame of the input video stream 10 for detection of the image edge in each frame. The gradient filter routine 212 is used to perform a gradient filtering operation on the input video stream 10 for calculation of the image gradient value. The low-pass filter routine 213 is used to perform a low-pass filtering operation on the input video stream 10 for smoothness of the image so that the noise on the image can be reduced.

Note that the input image that are processed with the above pre-processing routines can be used to build the background model of the monitored locality through the multiple background imagery extraction module 110 and the background imagery updating module 120, i.e. the values stored on the background imagery can be those that are the edge value, gradient value, or low-pass filtered value of the original image. The shadow of the target moving objects can be masked with the object mask produced by the target object extraction module 130 when the gradient value is used.

Post-Processing Module 220

The post-processing module 220 is used in the final stage for noise reduction of the object mask 302 produced by the target object extraction module 130. This allows the target moving object 11 displayed through the object mask 302 to be rendered more clearly and displayed with minimum noise.

In practice, the post-processing module 220 can be implemented with a noise reduction method based on morphological operations or based on a connected component area analysis method. Since these noise reduction techniques are all well-known technology in the industry, detailed description thereof will not be given in this specification.

OPERATION OF THE INVENTION

The following is a detailed description of an application example of the digital video target moving object segmentation system of the invention 100. In this application example, it is assumed that the content of the input video stream 10 is the scene of a monitored locality as schematically illustrated in FIG. 2A, which includes a target moving object 11 (such as an unauthorized intruder), a static background scene 12 (such as doors and windows), and a motional background object 13 (such as electrical fans).

In the first step, the multiple background imagery extraction module 110 is activated to process the input video stream 10 based on a background difference threshold comparison method to thereby produce background imagery of the monitored locality.

In the next step, the background imagery updating module 120 is activated to update the background imagery produced by the multiple background imagery extraction module 110 based on a background-matching and weight-counting algorithm to thereby produce an updated version of the background imagery which includes the motional background object 13 in addition to the static background scene 12.

In the final step, the target object extraction module 130 is activated to produce an object mask 302 based on the updated background imagery produced by the background imagery updating module 120. As illustrated in FIG. 2C, the object mask 302 defines an unmasking portion for the target moving object 11 and a masking portion for both the static background scene 12 and the motional background object 13. This object mask 302 is then superimposed to the current frame of the input video stream 10, whereby only the target moving object 11 is displayed in the current frame of the output video stream 20 while the static background scene 12 and the motional background object 13 are masked and thus invisible, as illustrated in FIG. 2D.

In the foregoing process, the pre-processing module 210 can be used for optimal performance of the video segmentation performed by the invention. Further, in the last stage, the post-processing module 220 can be used for noise reduction of the object mask 302, so that the target moving object 11 can be displayed through the object mask 302 with minimum noise and thus higher quality.

In conclusion, the invention provides a digital video target moving object segmentation method and system is characterized by the operations of a multiple background imagery extraction process and a background imagery updating process for extracting characteristic background imagery which contain the motional background object in addition to the static background scene; and wherein the multiple background imagery extraction process is based on a background difference threshold comparison method, while the background imagery updating process is based on a background-matching and weight-counting method. This feature allows an object mask to be defined based on the characteristic background imagery, which can mask both the motional background object as well as the static background scene. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A digital video target moving object segmentation method for processing an input video stream whose content shows the scene of a monitored locality having the presence of a static background scene, a motional background object, and a target moving object;

the digital video target moving object segmentation method comprising:

processing the input video stream based on a background difference threshold comparison method for producing background imagery of the monitored locality;

updating the background imagery based on a background-matching and weight-counting method for producing updated background imagery whose content includes the motional background object in addition to the static background scene; and producing an object mask based on the updated background imagery, wherein the object mask defines an unmasking portion for the target moving object and a masking portion for both the static background scene and the motional background object, and wherein the object mask is superimposed to the current frame of the input video stream for displaying the target moving object while masking the static background scene and the motional background object.

2. The digital video target moving object segmentation method of claim 1, further comprising:

determining each object's location, size, and shape based on the object mask; and performing object tracking, description, classification, and recognition on the basis of the target moving object segmentation.

3. The digital video target moving object segmentation method of claim 1, further comprising:

performing pre-processing operations on the input video stream for image enhancement, de-noise, edge detection, gradient value calculation and feature extraction of each object appearing in the input video stream.

4. The digital video target moving object segmentation method of claim 3, wherein the pre-processing operation includes:

an image edge detection process, which is capable of performing an operation of image edge detection on each object appearing in the input video stream.

5. The digital video target moving object segmentation method of claim 3, wherein the pre-processing operation includes:

a gradient filtering process, which is capable of performing an operation of gradient filtering on each object appearing in the input video stream.

6. The digital video target moving object segmentation method of claim 3, wherein the pre-processing operation includes:

a low-pass filtering process, which is capable of performing an operation of low-pass filtering on each object appearing in the input video stream.

7. The digital video target moving object segmentation method of claim 1, further comprising:

building a background model based on multiple pieces of background imagery for the input image after being processed by pre-processing operations through the background difference threshold comparison method and the background-matching and weight-counting method; wherein the values stored on the background imagery are selected from the group including edge values, gradient values, and low-pass filtered values of the original image; and wherein in the case of using gradient values, the shadow of the target moving objects is masked with the produced object mask.

8. The digital video target moving object segmentation method of claim 1, further comprising:
a post-processing operation, which is performed for noise reduction of the object mask.

9. The digital video target moving object segmentation method of claim 8, wherein the noise reduction operation is based on morphological operations.

10. The digital video target moving object segmentation method of claim 8, wherein the noise reduction operation is based on a connected component area analysis method.

11. The digital video target moving object segmentation method of claim 1, wherein the background difference threshold is set by using a manual preset method.

12. The digital video target moving object segmentation method of claim 1, wherein the background difference threshold is set by using an automatic noise-adaptive adjustment method.

13. The digital video target moving object segmentation method of claim 1, wherein the background difference threshold is set by using a Gaussian model based background difference threshold setting algorithm.

14. The digital video target moving object segmentation method of claim 1, wherein the background difference threshold is set by using a MoG (Mixture of Gaussians) model based background difference threshold setting algorithm.

15. A digital video target moving object segmentation system for processing an input video stream whose content shows the scene of a monitored locality having the presence of static background scenes, motional background objects, and target moving objects;
the digital video target moving object segmentation system comprising:
a multiple background imagery extraction module, which is capable of processing the input video stream based on a background difference threshold comparison method for producing background imagery of the monitored locality;
a background imagery updating module, which is capable of updating the background imagery produced by the multiple background imagery extraction module based on a background-matching and weight-counting method for producing updated background imagery whose content includes the motional background objects in addition to the static background scenes; and
a target object extraction module, which is capable of producing an object mask based on the updated background imagery produced by the background imagery updating module, wherein the object mask defines an unmasking portion for the target moving object and a masking portion for both the static background scenes and the motional background objects, and wherein the object mask is superimposed to the current frame of the input video stream for displaying the target moving object while masking the static background scenes and the motional background objects.

16. The digital video target moving object segmentation method of claim 15, further comprising:
determining each object's location, size, and shape based on the object mask; and
performing object tracking, description, classification, and recognition on the basis of the target moving object segmentation.

17. The digital video target moving object segmentation system of claim 16, further comprising:
a pre-processing module, which is capable of performing a set of pre-processing operations on the input video stream for image enhancement, de-noise, edge detection, gradient value calculation and feature extraction of each object appearing in the input video stream.

18. The digital video target moving object segmentation system of claim 17, wherein the pre-processing module includes:
an image edge detection routine, which is capable of performing an operation of image edge detection on each object appearing in the input video stream.

19. The digital video target moving object segmentation system of claim 17, wherein the pre-processing module includes:
a gradient filter routine, which is capable of performing an operation of gradient filtering on each object appearing in the input video stream.

20. The digital video target moving object segmentation system of claim 17, wherein the pre-processing module includes:
a low-pass filter routine, which is capable of performing an operation of low-pass filtering on each object appearing in the input video stream.

21. The digital video target moving object segmentation system of claim 16, further comprising:
means for building a background model based on multiple pieces of background imagery for the input image after being processed by pre-processing operations through the background difference threshold comparison method and the background-matching and weight-counting method; wherein the values stored on the background imagery are selected from the group including edge values, gradient values, and low-pass filtered values of the original image; and wherein in the case of using gradient values, the shadow of the target moving objects is masked with the produced object mask.

22. The digital video target moving object segmentation system of claim 16, further comprising:
a post-processing module, which is used for performing a noise reduction operation on the object mask produced by the target object extraction module.

23. The digital video target moving object segmentation system of claim 22, wherein the noise reduction operation is based on morphological operations.

24. The digital video target moving object segmentation system of claim 22, wherein the noise reduction operation is based on a connected component area analysis method.

25. The digital video target moving object segmentation system of claim 16, wherein the background difference threshold is set by using a manual preset method.

26. The digital video target moving object segmentation system of claim 16, wherein the background difference threshold is set by using an automatic noise-adaptive adjustment method.

27. The digital video target moving object segmentation system of claim 16, wherein the background difference threshold is set by using a Gaussian model based background difference threshold setting algorithm.

28. The digital video target moving object segmentation system of claim 16, wherein the background difference threshold is set by using a MoG (Mixture of Gaussians) model based background difference threshold setting algorithm.

29. A digital video target moving object segmentation system for processing an input video stream whose content shows the scene of a monitored locality having the presence of a static background scene, a motional background object, and a target moving object;
the digital video target moving object segmentation system comprising:

a pre-processing module, which is capable of performing a set of pre-processing operations on the input video stream for image enhancement, de-noise, edge detection, gradient value calculation and feature extraction operated on the image of each object appearing in the input video stream;

a multiple background imagery extraction module, which is capable of processing the input video stream based on a background difference threshold comparison method for producing background imagery of the monitored locality;

a background imagery updating module, which is capable of updating the background imagery produced by the multiple background imagery extraction module based on a background-matching and weight-counting method for producing updated background imagery whose content includes the motional background object in addition to the static background scene;

a target object extraction module, which is capable of producing an object mask based on the updated background imagery produced by the background imagery updating module, wherein the object mask defines an unmasking portion for the target moving object and a masking portion for both the static background scene and the motional background object, and wherein the object mask is superimposed to the current frame of the input video stream for displaying the target moving object while masking the static background scene and the motional background object; and a post-processing module, which is used for performing a noise reduction operation on the object mask produced by the target object extraction module.

* * * * *